March 31, 1964 H. WALDMAN 3,127,474

TELEPHONE ANSWERING APPARATUS

Filed Oct. 13, 1958 4 Sheets-Sheet 1

INVENTOR.
HERBERT WALDMAN
BY Hane and Nydick
ATTORNEYS

March 31, 1964 H. WALDMAN 3,127,474

TELEPHONE ANSWERING APPARATUS

Filed Oct. 13, 1958 4 Sheets-Sheet 2

INVENTOR.

HERBERT WALDMAN

BY Hane and Nydick

ATTORNEYS

March 31, 1964 H. WALDMAN 3,127,474

TELEPHONE ANSWERING APPARATUS

Filed Oct. 13, 1958 4 Sheets-Sheet 3

INVENTOR.
HERBERT WALDMAN
BY Hane and Nydick
ATTORNEYS

March 31, 1964 H. WALDMAN 3,127,474

TELEPHONE ANSWERING APPARATUS

Filed Oct. 13, 1958 4 Sheets-Sheet 4

INVENTOR.
HERBERT WALDMAN

BY Kane and Nydick

ATTORNEYS

United States Patent Office 3,127,474
Patented Mar. 31, 1964

3,127,474
TELEPHONE ANSWERING APPARATUS

Herbert Waldman, Brooklyn, N.Y., assignor, by mesne assignments, to Royal Business Funds Corporation, New York, N.Y., a corporation of New York Filed Oct. 13, 1958, Ser. No. 766,746
20 Claims. (Cl. 179—6)

This invention relates to an apparatus for automatically answering a telephone call by transmitting pre-recorded messages to the calling party and recording messages from the calling party.

There are known telephone-answering apparatus of this kind in which the shifting from one phase of operation to the next phase and the re-cycling back to the standby position of the apparatus, is controlled by mechanical means, such as, for example, by the movement of a tone arm on a record disk, or by a motor-driven series of cams and cam followers.

The concept of the present invention resides in providing an endless loop of a magnetic tape as the carrier for the pre-recorded message and in utilizing this endless loop in conjunction with a multiple position switch such as a stepping relay as sequence control means, causing the apparatus to be switched through its respective phases and finally to be restored to its initial condition.

This system of electrical sequence control is very versatile in nature and affords a number of important advantages and accomplishes various objects. Due to the endless loop of magnetic tape, unlike a record disk, it is readily possible to change the outgoing pre-recorded announcement message by simply recording a different message on the loop tape. A fixed-time cycle record period or an extended non-cycling record period can be selected by the simple flick of a switch. The system facilitates the provision of a very useful feature, namely, an "Automatic Play Back" of the messages recorded by the calling parties by means of a single switching operation. At the conclusion of the play back the apparatus automatically resets itself to its standby condition, in readiness to receive additional calls.

It is also an object of the invention to provide an apparatus which is self-contained and requires only that the apparatus and the telephone are placed in a certain spatial relationship to enable the apparatus to perform its intended functions. This affords the important advantage that all electric connections and physical attachments between the apparatus and the installation are avoided thus making it unnecessary for the operator of the telephone system to install the apparatus.

Another object of the invention is to provide an improved and simplified telephone handset lifting mechanism, avoiding the problem of electrical interference or hum in the telephone circuit and a fail-safe arrangement coacting with the lift mechanism to prevent a prolonged opening of the telephone circuit in the event of power or other failure in the apparatus.

Another object of the present invention is to utilize readily available recording media such as magnetic tape, for recording the messages. This affords the advantage that a recorded tape may be filed away for future reference and can be replaced by a new reel of tape for subsequent recordings.

Another object of the invention is to provide an extremely simplified arrangement for selectively driving both the endless tape and the message recording tape either separately or simultaneously by a single motor.

A further object of the present invention is to provide a telephone-answering apparatus which is capable of recording messages of various desired duration and which is not dependent upon any fixed time period for its performance, being capable of recording long or short messages.

A still further object of the present invention is to provide rewind means which control the rewinding of the magnetic tape for purpose of playback to be limited to the portion of tape that has messages recorded upon it.

A still further object of the present invention is to provide control means which cause termination of the playback period at the conclusion of the playback of the last message.

A still further object of the present invention is to provide means by which the apparatus will, automatically, discriminate between old messages already once played back and current ones so as to play back only the current ones.

Other and further objects, features and advantages of the invention will be pointed out hereinafter and set forth in the appended claims constituting part of the application.

In the accompanying drawings, a preferred embodiment of the invention is shown by way of illustration and not by way of limitation.

Figures 2, 3:
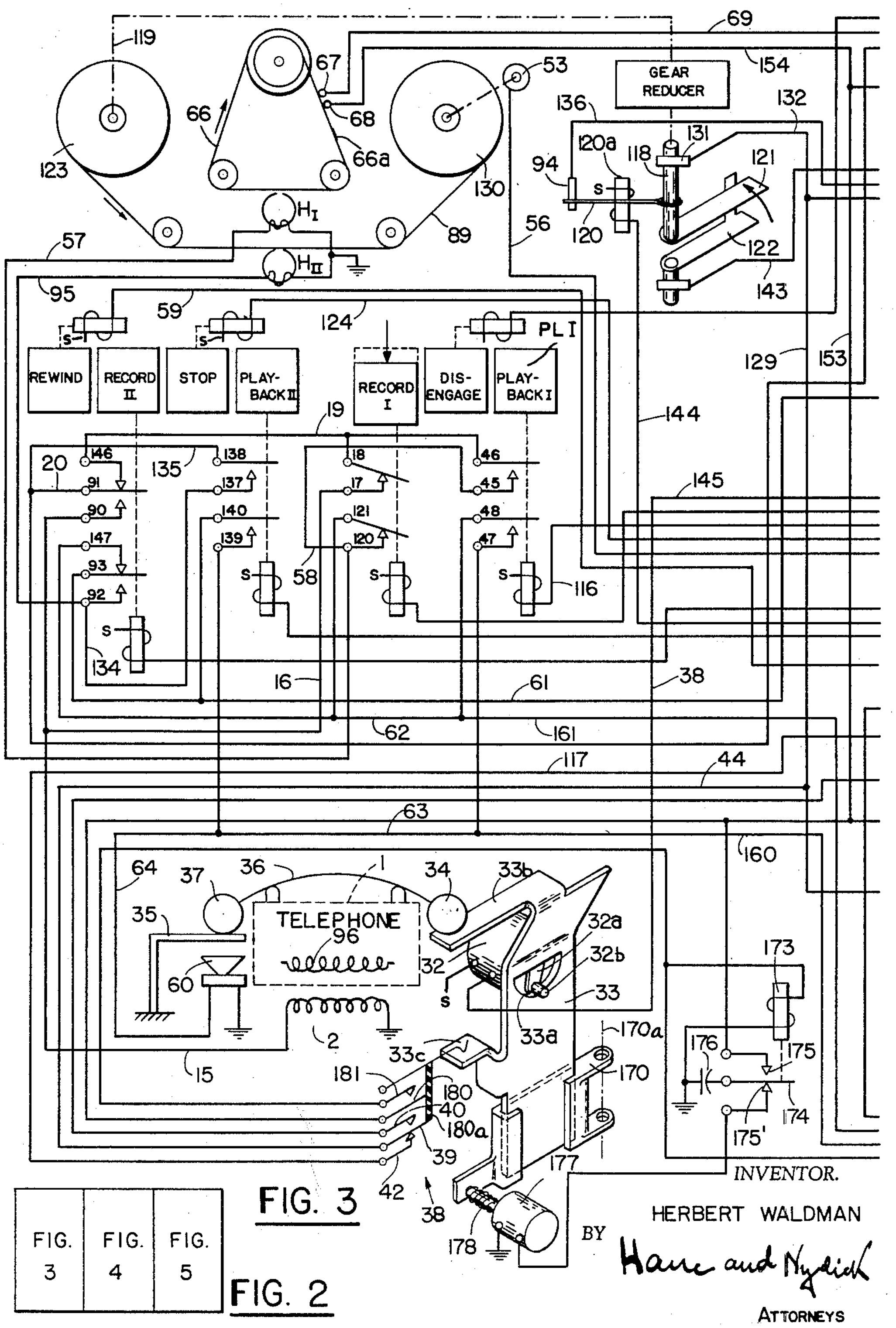
FIG. 2 is a block diagram showing the lay-out of the circuit figures.
Figure 4:
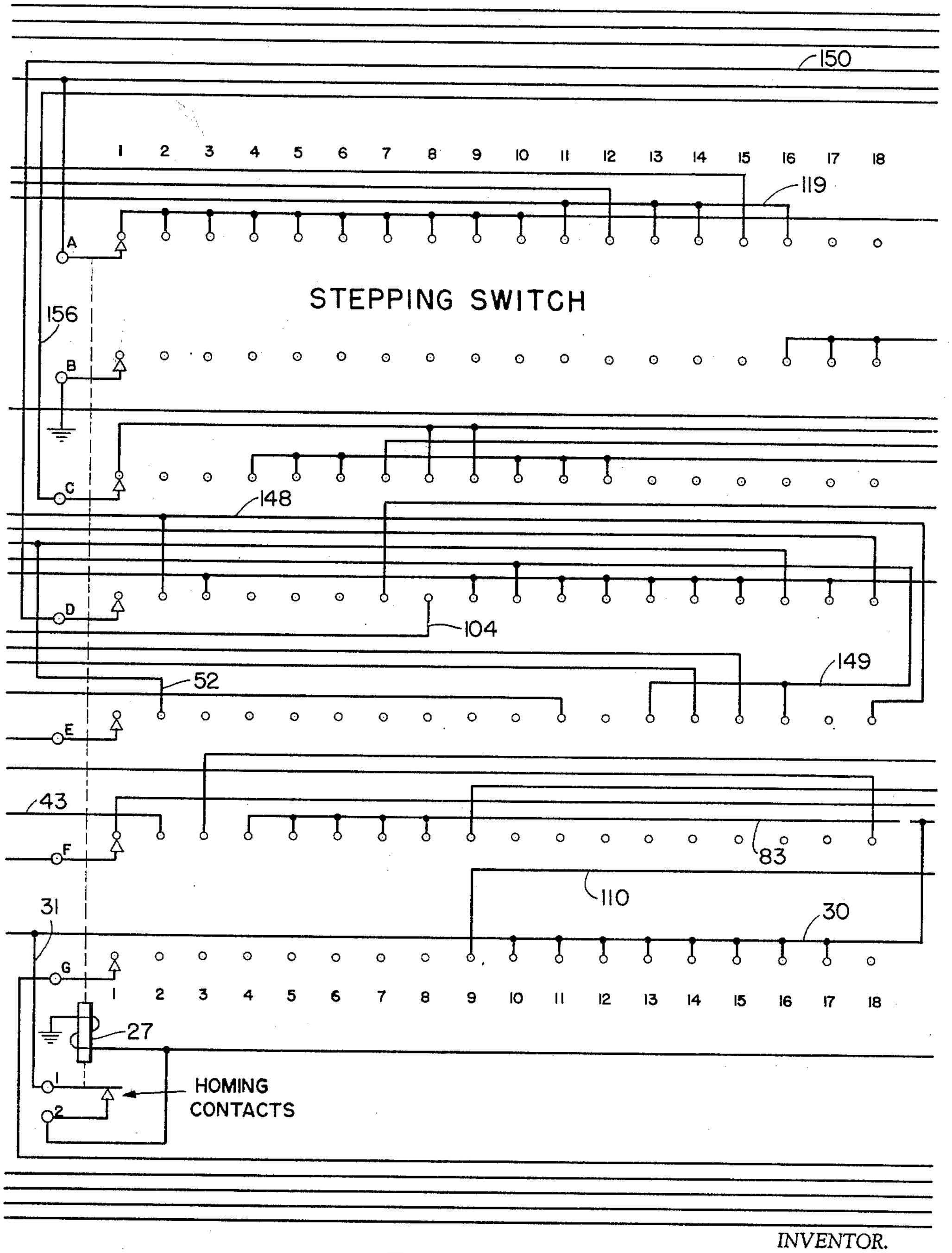
Figure 5:
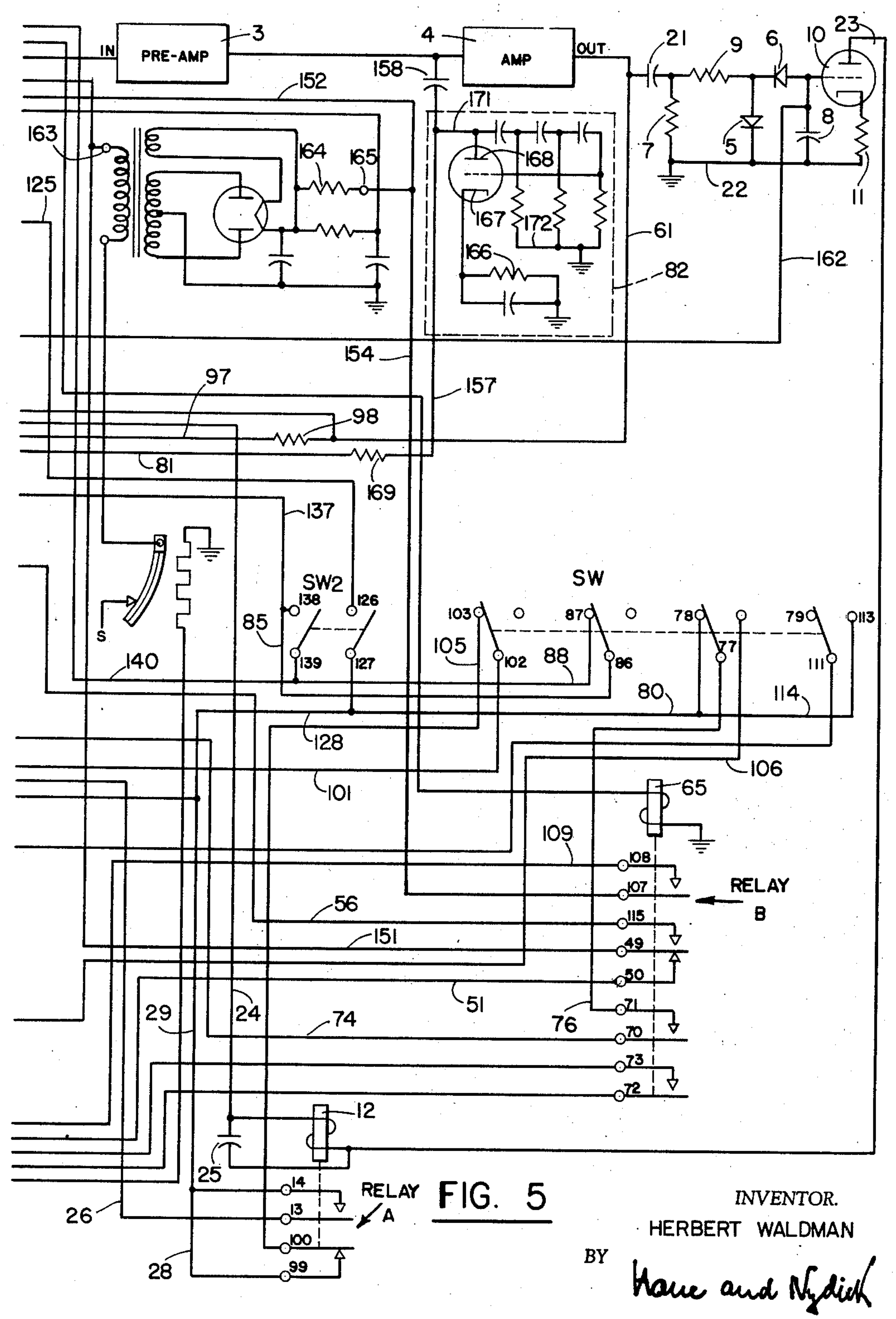

FIGS. 3, 4 and 5 when combined in accordance with FIG. 2, show the complete circuit system of the apparatus.

Before referring to the figures in detail, it should be pointed out that the telephone answering apparatus according to the invention comprises all the equipment, both mechanical and electronic that is customary in recording and reproducing apparatus and that such equipment is of conventional design. Accordingly, only the components that are essential for the understanding of the invention are shown and described.

Figure 1:
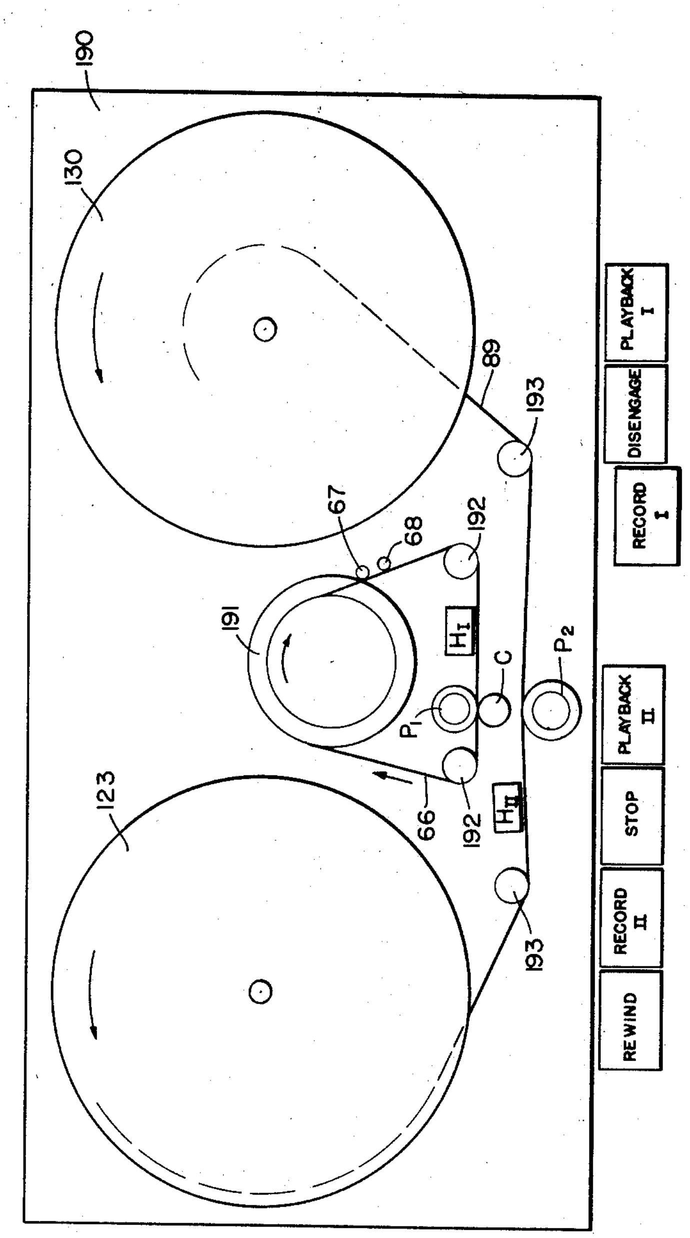
FIG. 1 is a schematic plan view of a telephone-answering apparatus according to the invention.

Referring first to FIG. 1 in detail, this figure shows the chassis plate 190 of the apparatus, the shield concealing part of the mechanism being removed. The apparatus of the invention employs two sound-carriers, such as magnetic tape. One of the tapes is in the form of an endless loop 66 and serves to pre-record and reproduce a message to be transmitted to the calling party, the other tape 89 serves to record the messages transmitted by the calling party and to reproduce the recorded messages to the user of the apparatus.

Tape 66 is fed from and returned into a cartridge 191 of conventional design. The tape 66 is guided by means of idlers 192, past a sound head HI and between a capstan C and a pressure roller P1.

Tape 89 travels from a supply reel 123 to a take-up reel 130 and vice versa. The tape is guided by means of idlers 193 and past a sound hand HII and between the capstan and a second pressure roller P2.

The capstan should be visualized as being driven from the main motor of the apparatus. It drives either tape 66 or tape 89 when the respective pressure roller P1 or P2 is moved into frictional engagement with the capstan. The structure for moving the pressure rollers into and out of engagement with the capstan does not constitute part of the present invention. Any suitable mechanism may be used and such mechanism is fully described in my copending application No. 657,931, filed May 8, 1957 now Patent No. 2,896,945.

FIG. 1 further shows two banks of three or four knobs respectively. The knobs are labelled to indicate the respective function. They should be visualized as being interlocked so that the actuation of any of the knobs releases all the other knobs in the same bank. The mechanism actuated by the knobs and the coaction of the mechanisms with the components proper activating the sound recording and reproducing operations; the forward travel and rewind of tape 89, etc., do not constitute part of the invention. Any suitable arrangement may be used such as described in my aforementioned copending application.

Turning now to FIGS. 3, 4 and 5; in the circuit diagram of FIGS. 3, 4 and 5, each wire marked S is presumed to extend to a terminal of a current source. The circuit system also provides a D.C. potential of which the negative terminal is indicated by G*nd*. Each wire in the diagram marked ground is presumed to extend to said negative terminal. Due to this convention the drawing may be simplified by the omission of many unnecessary lines. The positive terminal 165 is connected to the positive side of the power supply via a voltage dropping resistor 164. The B+ and B− terminals of the power supply unit are adapted to apply proper direct voltages to the vacuum tube elements. In response to an incoming call to the base 1 of a telephone receiver the ringing current through a coil 96 in the telephone base 1 induces a signal in an induction coil 2, disposed subjacent to telephone base 1, in a known manner. This signal is amplified in a pre-amp. 3 and also an amp. 4, the output of which is applied to rectifiers 5 and 6 and to a resistor 7, to ground. The telephone ringing signal thus rectified is passed to a condenser 8, charging the latter. The condenser 8 and resistor 9 have values selected to operate as a time constant circuit, applying a positive bias to a tube 10, after a suitable charging period such as, for example, two seconds. In the absence of a bias from condenser 8, tube 10 is biased by its cathode resistor 11, so that the tube will draw very little current. When the tube is positively biased upon receipt of the telephone ringing signal, as described, then substantial current flows through the tube energizing coil 12 of a relay A, causing it to close its contacts 13 and 14. The described connections can be traced in the following circuit:

*Circuit 1.*—G*nd* induction coil 2, lead 15, lead 16, contacts 17 and 18 of a snap action switch button Rec.$_1$, lead 19, contacts 146 and 91, lead 20, pre-amp. 3, amp. 4, a coupling condenser 21, and the time constant circuit consisting of resistor 9 and condenser 8.

The condenser 8 when charged as described, applies the positive bias to tube 10 causing a substantial current to flow through it, energizing the coil 12 of a relay A thereby closing contacts 13 and 14 as already mentioned. This can be traced in the following circuit:

*Circuit 2.*—G*nd*, lead 22, resistor 11, tube 10, lead 23, coil 12, lead 24, contact 1 on level C of a stepping relay, contact C, lead 156, B+.

A condenser 25 parallel with coil 12, serves to eliminate any relay chatter. The closing of contacts 13 and 14 energizes the stepper coil 27 stepping the stepping relay from position 1 into position 2.

*Circuit 3.*—Power supply terminal 165, leads 152 and 153, contact F of the stepping relay, contact 1 on level F, lead 26, contact 13, contact 14, leads 29, 30 and 31, homing contacts 1 and 2, stepping relay coil 27, G*nd*.

In stepping relay position 2, the motor 32 of a lifting mechanism for the telephone handset 36 is activated to lift the handset from its cradle thereby closing the telephone circuit of the calling party. The handset is shown as being lifted at its earpiece 34 and a bracket 35 serves to support the mouthpiece 37 of the handset 36, during the lifting operation and in the lifted position.

The lifting mechanism as shown comprises a slide 33 slidable in a guide track 170 which, in turn, is pivotal about the axis 170*a* of a hinge-pin mounted in the case of the apparatus (not shown). Slide 33 includes a semicircular opening 33*a* which constitutes a camming surface for a cam follower 32*b* secured to an arm 32*a* seated on the shaft of motor 32 for rotation in unison therewith. The slide terminates in a bracket 33*b* which underlies the earpiece 34 of the handset and has also a lateral bracket 33*c*. The position of the slide 33 controls the make-and-break switch assembly 38. This switch assembly includes stationary contact springs 42, 40 and 181 and movable contact springs 39 and 180. The movable springs are joined by a lifting bar 180*a* actuated by the displacement of the slide. Contact 42 is connected to contact 18 in level F of the stepping relay; contact 39 is connected to homing contacts 1 and 2; contact 40 is connected to contact 2 in level F of the stepping relay; contact 180 is connected with power terminal 165; and contact 181 is connected with one terminal of the coil of a relay 173, the other terminal of the coil being grounded. This relay constitutes part of a fail-safe arrangement and controls for this purpose a movable contact 174 coacting with stationary contacts 175 and 175′ and grounded through a capacitor 176. Contact 175 is connected to power terminal 165 and contact 175′ is connected to ground through a solenoid coil 177. When the solenoid is energized its armature swings slide 33 from the illustrated position into a release position in which cam follower 32*b* leaves camming opening 32*a*, a spring 178 urging the slide into the illustrated position.

Motor 32 when activated, lifts the slide by means of cam follower 32*b* and with it earpiece 34 and the lifting bar 172. As a result the handset is raised sufficiently above the cradle to open the communication circuit and in the switch assembly contacts 180, 181 and 39, 40 close and contacts 42, 39 open. Closing of contacts 180, 181 connects relay 173 to power terminal 165. The relay now closes its contacts 174, 175 thus connecting capacitor 176 in a charging circuit to power terminal 165. Relay 173 remains energized as long as the handset is lifted and the apparatus is under power. If the power should fail for any reason, the relay becomes deenergized thus reclosing contacts 174 and 175′. As a result the capacitor discharges through solenoid 178, causing the same to attract its armature. The armature will swing slide 33 into the release position, thus freeing the handset to fall back upon the cradle whereby the open communication circuit is closed. This affords the advantage that when a power failure or other failure occurs at a stage of the cycle at which the handset is lifted and the communication circuit is open, the handset is automatically restored to its position resting upon the cradle, thus terminating the communication connection which otherwise would remain open until manually closed.

The circuit for motor 32 is as follows:

*Circuit 4.*—Power supply terminal 163, lead 150, contact D of the stepper, contact 2 of level D, lead 38, motor 32, lead S.

In the stepping relay position 2 the solenoid PL$_1$ is also energized, releasing the solenoid of switch Rec.$_1$ from the latched position which constitutes the standby position of the apparatus as explained hereinafter, opening the contacts 17 and 18 and closing contacts 45 and 46, 47 and 48.

*Circuit 5.*—Power supply terminal 163, lead 151, contacts 49 and 50 of relay B, lead 51, contact E, contact 2 of level E, leads 52 and 116, solenoid PL$_1$, lead S.

The closing of contacts 39 and 40 energizes the stepper coil 27 stepping the stepping relay from position 2 to position 3.

*Circuit 6.*—Power terminal supply 165, leads 152 and 153, contact F, contact 2 of level F, lead 43, contact 40, contact 39, lead 44, lead 31, stepper coil 27, G*nd*.

In the stepping relay position 3 motor 32 is stopped and the recorder motor 53 is activated bringing into operation the tape drive mechanism. As the PL$_1$ solenoid has been energized as described, the pressure roller P1 is now in engagement with the capstan C, driving the endless loop of tape 66 past sound head HI. The details of the coaction of the PL$_1$ solenoid with the pressure roller 1 so as to engage it with the capstan C are not shown because they can be accomplished in any suitable manner known in the art. In this connection reference is made to my corresponding application Serial No. 657,931 filed May 8, 1957 issued as Patent 2,896,946 on July 28, 1959, which describes in detail a suitable structure. The play-out to the calling party of any announcement that may have been prerecorded upon the endless loop by the telephone subscriber is now effected. An example of an announcement might be, for example, "This is an automatic secretary answering. Kindly leave your name, address and telephone number, and any message you wish to leave. Start talking at the end of the tone signal." The record motor 53 circuit is as follows:

*Circuit 7.*—Power supply terminal 163, lead 150, contact D, contact 3 of level D, lead 56, recorder motor 53, lead S. The play-out circuit can be traced as follows:

*Circuit 8.*—*Gnd,* head HI, lead 57, lead 58, contacts 45 and 46 of the snap action switch $PL_1$, lead 19, contacts 146 and 91, lead 20 of the input of pre-amp. 3, amp. 4, out to a speaker 60 by way of lead 61, contacts 93 and 147, lead 62, snap action switch contacts 48 and 47, lead 63, lead 64, speaker 60, *Gnd.*

The audio pulses emanating from the speaker 60 are transmitted to the calling party by way of the adjacent mouthpiece 37 of the telephone handset 36, over the telephone lines (not shown).

A small portion 66ª on the endless loop tape 66 is coated with a paint of conductive silver. As the endless loop comes to the end of its cycle this silver coated portion passes two contact guide posts 67 and 68 completing a circuit for the energization of coil 65 of a relay B. This causes relay B to close its normally open contacts.

*Circuit 9.*—Power supply terminal 165, leads 152 and 154, contact guide post 68, conductive silver strip 66ª, contact guide post 67, lead 69, coil 65 of relay B, *Gnd.*

As is apparent the energizing of the relay B coil 65 is primarily a function of the cycle of the endless loop. The control of relay B by means of a conductive loop portion is shown by way of example only. Any suitable and known contact signal producing means other than conductive silver paint may be used to this end, for example, a small piece of metal foil may be applied to a portion of the endless loop tape. Another example would be to utilize a transparent portion of the endless loop tape. Another example would be to utilize a transparent portion of the endless loop tape in conjunction with a photo-conductive or photoelectric cell unit which would respond to a light source as the transparent portion on the tape passes the light sensitive area. This latter method, which is well known in principle, would eliminate the need for the two contacting guide posts 67 and 68. The closing of relay B contacts 70 and 71 energizes the stepper coil 27, stepping the stepping relay out of position 3 into position 4. The energization of the stepper coil 27 is accomplished in the following manner:

*Circuit 10.*—Power supply terminal 165, leads 152 and 153, contact F, contact 3 of level F, lead 74, contacts 70 and 71 of relay B, lead 76, pole 77 to terminal 78 of a rotary-type selector switch SW, leads 80, 128, 30, 31, homing contacts 1 and 2, stepper coil 27, *Gnd.*

The function of the switch SW will be subsequently described. In stepping relay position 4, a circuit for an oscillator 82 is completed thereby generating an audio frequency signal in a known manner.

*Circuit 11.*—*Gnd,* resistor 166, cathode 167, plate 168, leads 171 and 157, resistor 169, lead 81, contact 4 of level C, contact C, lead 156, B+.

The resulting frequency signal is impressed upon amplifier 4, being transmitted in the form of a tone signal via speaker 60.

*Circuit 12.*—RC circuit network 172, lead 171, coupling capacitor 158, amplifier 4, amplifier out lead 61, contacts 93 and 147, lead 62, contacts 48 and 47 of $PL_1$ solenoid, leads 63, 64, speaker 60, *Gnd.*

The tone signal is maintained throughout the stepper positions 5 and 6 as is evident from the connections of contacts 5 and 6 of level C. Said tone signal serves to inform the calling party that the apparatus is now ready to record his message. From position 4 the stepping relay continues without interruption into position 9.

*Circuit 13.*—Power supply terminal 165, leads 152 and 153, contact G, contacts 4, 5, 6, 7 and 8 of level F, leads 83, 30 and 31, homing contacts 1 and 2, stepper coil 27, *Gnd.*

While the stepping relay progresses from position 4 into position 9 the following circuits are rendered effective to ready the apparatus form recording the incoming message over the telephone lines. In position 7 the disengaged solenoid is energized, releasing the solenoid of $PL_1$ and causing the disengagement of the pressure roller P1 from the capstan C whereby the conductive silver portion of the endless loop tape will remain in contact with the posts 67 and 68 during the entire recording of the message from the calling party.

*Circuit 14.*—Power supply terminal 163, lead 150, contact D, contact 7 of level D, leads 137 and 85, pole 86 to terminal 87 of switch SW, leads 88 and 140, disengage solenoid, lead S.

In this connection it should be remembered that the relay B coil 65 is energized as long as the silver coated portion of the endless loop tape is in contact with posts 67 and 68, that is, throughout the entire message recording period and slightly beyond. The purpose of relay B in relation to the restoration of the apparatus to its original condition upon the conclusion of the incoming message will become apparent from the subsequent description. In position 8 the $Rec._2$ solenoid is energized, causing the engagement of the pressure roller P2 with the capstan C to drive the tape 89 past head HII.

*Circuit 15.*—Power supply terminal 163, lead 150, contact D, contact 8 of level D, lead 104, $Rec._2$ solenoid, lead S.

The driving of tape 89 takes place in stepping relay position 9, in which the motor 53 becomes activated. The circuit for motor 53 can be traced in circuit 7. The $Rec._2$ solenoid also activates the snap action switch $Rec._2$ to close its contacts 90 to 91 and 92 to 93. The closing of contacts 90 and 91 switches the induction coil 2 to the input of the pre-amp. 3.

*Circuit 16.*—*Gnd,* induction coil 2, lead 15, contacts 90 and 91, lead 20, pre-amp. 3.

The closing of contacts 92 and 93 switches the head HII to the output of the amplifier 4.

*Circuit 17.*—*Gnd,* head HII lead 95, contacts 92 and 93, lead 61, amplifier 4 output.

The apparatus is now conditioned to pick up any message transmitted by the calling party via the induction coil 2. The picked-up signals are passed through the amplifier to the recording head HII, and recorded onto tape 89. In the stepping relay position 7 a positive pulse is applied to the condenser 8 which, in turn, applies a positive bias to tube 10, causing substantial current flow through it. This current flow energizes the coil 12 of relay A as has been previously described causing it to open its normally closed contacts 99 and 100.

*Circuit 18.*—Power supply terminal B+, lead 156, contact C, contact 7, lead 97, voltage dropping resistor 98, lead 61, coupling capacitor 21 onto the biasing condenser 8.

Relay A remains energized in the stepping position 9 notwithstanding the fact that the positive pulse provided in position 7, as described, is not present now. This continued energization of relay A is due to the charging capacity of the time constant circuit which includes resistor 9 and condenser 8. In order for the bias which has been imposed upon tube 10 to be discharged, this bias must be bled off from not only resistor 9, but also from resistor 7, the values of which are selected so as to allow a suitable time of operation, such as, for example, seven seconds. This will not occur as long as any signals are being passed from the amplifier 4 to the biasing condenser 8. As long as sound signals are being transmitted by the calling party, bias is continually supplied to tube 10 to hold relay A energized. At the end of the message, after a selected considerable silent period, such as seven seconds, bias on tube 10 will be sufficiently bled off so that tube 10 will no longer energize relay A which thereby recloses its contacts 99 and 100. The closing of said contacts while the stepping relay is in position 9 steps the relay out of position 9 into position 10.

*Circuit 19.*—Power supply terminal 165, leads 152 and 153, contact F, contact 9 at level F, lead 101, pole 102 to terminal 103 of the rotary selector switch SW, lead 105, contacts 100 and 99 of relay A, leads 28, 29, 30, 31, homing contacts 1 and 2, stepper coil 27, G*nd*.

In this connection it should be noted that the arrangement is capable of recording messages of various desired durations and is not dependent upon a fixed time cycle for its purpose, being capable of recording long or short messages and of automatically moving into a non-operative position after the completion of either a long or short message. In this connection the function of the selector switch SW becomes apparent, for by changing the setting of said switch from the illustrated position into the opposite position, the heretofore described extended-non-cycle arrangement is transformed into a fixed-time-cycle arrangement, the time length of which is determined by the time cycle length of the endless loop tape 66. To understand this change-over, reference is made to circuit 10 which describes that the closing of relay B contacts 70 to 71 energizes the stepper coil 27 stepping the stepping relay out of position 3 at the conclusion of the announcement play-out cycle. The sequence of operations and modified associated circuits, resulting from the changed setting of switch SW, will be subsequently described in relation to the respective stepping relay positions 3 to 9, starting at the conclusion of the announcement play-out period.

*Circuit 10–A.*—Power supply terminal 165, leads 152 and 153, contact F, contact 3 of level F, lead 74, contacts 70 and 71 of relays B, lead 76, pole 77 to terminal 79 of the rotary type selector switch SW (now switched) lead 106, stepper coil 27, G*nd*.

The distinction between circuits 10 and 10–A is that in circuit 10, the stepper coil 27 is not impulsed directly, but rather by its homing contacts whereas in circuit 10–A the stepping impulse is applied directly to coil 27. By using a stepping relay of the step-on-break of impulse type, the stepping action in circuit 10–A, unlike in circuit 10, does not occur immediately upon the closing of relay B contacts 70 and 71, but rather only upon their reopening. This happens as the endless loop continues in its circular course when the silver coated portion shifts away from the contact posts 67 and 68, deactivating coil 65 of relay B, consequently effecting the reopening of contacts 70 and 71. The stepping relay now steps out of position 3 into position 4. This time the energization of the disengage solenoid as described in circuit 13 relative to the stepping relay position 7, releasing the $PL_1$ solenoid, cannot be effected, due to the changed setting of switch SW, in which pole 86 engages a blind contact. In this connection it should be remembered that the endless loop now continues in its course uninterrupted completing its current cycle in stepping relay position 3, and starting a second one in stepping relay position 9. From position 4 the stepping relay continues on uninterrupted into position 9 as described in circuit 13. On passing position 8 the $Rec._2$ solenoid is energized. This solenoid conditions the apparatus, both mechanically and electrically, for recording the incoming messages as has already been described in detail previously, with reference to stepping relay position 8. It will be noted that solenoid $PL_1$, now also in depressed condition, does not conflict circuitwise with the circuit arrangement as described in circuits 16 and 17 relative to the energization of $Rec._2$ solenoid. This is so because contacts 46 and 48 of the snap action switch $PL_1$ are dependent upon contacts 146 and 147 respectively, of snap action Rec. $_2$ to be in closed condition with their respective contact poles 91 and 93. The biasing of tube 10 by the positive impulse imparted in the stepping relay position 7, as described in circuit 18, is of no consequence this time, with respect to utilizing relay A contacts 100 and 99 to step the stepping relay out of position 9 upon conclusion of the incoming message, terminating the recording period. Again this is due to the changed setting of switch SW; pole 102 is now engaging a blind contact instead of terminal 103, thus disconnecting relay A contact 100 from the plus side of the power source. In this setting of switch SW, the stepping relay stepping out of position 9 is governed by the endless loops 66 cycle, consequently limiting the recording period to a fixed-time cycle corresponding to the cycling time of the endless loop, such as, for example thirty seconds. When the endless loop 66 approaches the end of its cycle the silver coated portion $66^a$, again establishes contact with the posts 67 and 68 thus completing the circuit for the energization of coil 65 of relay B, as has been previously described in circuit 9. The energizing of relay B coil 65 closes contacts 107 to 108, thus energizing the stepper coil 27 for stepping the stepping relay out of position 9 into position 10.

*Circuit 20A.*—Power supply terminal 165, lead 154, contacts 107 and 108 of relay B, lead 109, contact G, contact 9 of level G, lead 110, pole 111 to terminal 113 of switch SW, leads 114, 80, 128 and 30, lead 31, homing contacts 1 and 2, stepper coil 27, G*nd*.

In position 10 the stop solenoid is energized, releasing the $Rec._2$ solenoid to stop the tape 89 movement and to switch the apparatus out of the "record" condition.

*Circuit 21.*—Power supply terminal 163, lead 150, contact D, contact 10 of level D, lead 124, stop solenoid, lead S.

As is now evident the system has a considerable degree of flexibility, lending itself to be used in either an extended-non-cycling or a fixed-time cycle arrangement in recording the incoming message. The selection of the desired arrangement is effected by merely setting switch SW. Furthermore, the utility of the endless loop, both as the "announcement" carrier and as a sequence control means, is now apparent.

Starting with stepping relay position 10, the sequence of operations and associated circuitry are the same for either setting of switch SW. The utility of relay B in relation to the restoration of the apparatus to its original condition, will now also become apparent. In connection with this it should be borne in mind that the relay B coil is maintained energized for a while, coincident with the contacting interval of the silver coated portion $66^a$ with the contact posts 67 and 68. Consequently, relay B contatcs 107 and 108 are maintained closed during said interval activating the stepping relay to step from position 10 into position 17.

*Circuit 22.*—Power supply terminal 165, lead 154, contacts 107 and 108 of relay B, lead 109, contact G, contacts 10, 11, 12, 13, 14, 15 and 16 of level G, leads 30 and 31, homing contacts 1 and 2, stepper coil 27, G*nd*.

In positions 10 to 12 inclusive, the audio frequency oscillator 82 circuit is again completed, generating an audio frequency.

*Circuit 23.*—G*nd*, resistor 166, cathode 167, plate 168, lead 157, resistor 169, lead 81, contacts 10, 11 and 12 of level C, contact C, lead 156, B+.

Said audio frequency signal is impressed upon amplifier 4, being transmitted in the form of a tone signal via speaker 60, to inform the calling party that the recording period had been terminated.

*Circuit 24.*—RC circuit network 172, lead 171, coupling capacitor 158, amplifier 4, amplifier out lead 61, contacts 93 and 147, leads 62 and 161, contacts 73 and 72 of relay B, leads 160, 63 and 64, speaker 60, G*nd*.

In passing of the relay through position 16 the condenser 8 is discharged of any residual charge that may be accumulated on it subsequent to the recording period. The purpose of this is to maintatin the timing of the time constant circuit governed by said condenser constant at all times.

*Circuit 25.*—*Gnd*, contact B, contacts 16, 17 and 18 of level B, lead 162, top electrode of condenser 8.

In relay position 17 the recorder motor 53 is energized causing the endless loop 66 to resume its movement completing its cycle. The recorder motor circuit is as follows:

*Circuit 26.*—Power supply terminal 163, lead 150, contact D, contact 17 of level D, lead 56, recorder motor 53, lead S.

As it is assumed that the SW switch has been set to engage its right hand terminals, it is necessary to effect the engagement of the pressure roller P1 with the capstan C in order to ready the endless loop for renewed travel. This is accomplished in the stepping relay position 16 of level D by energizing the $PL_1$ solenoid.

*Circuit 27.*—Power supply terminal 163, lead 150, contact D, contact 16 of level D, lead 116, $PL_1$ solenoid, lead S.

As the endless loop 66 comes to the end of its cycle, the silver-coated portion 66$^a$ passes the two contact guide posts 67 and 68 completing the circuit for the energization of coil 65 of relay B, thereby causing relay B to close its normally open contacts. This can be followed circuitwise in circuit 9.

The closing of relay B contacts 107 to 108 energizes the stepper coil 27, stepping the stepping relay out of position 17 into position 18. The energization of the stepper coil 27 is accomplished in the following manner:

*Circuit 27*$^a$.—Power supply terminal 165, lead 154, contacts 107 and 108 of relay B, lead 109, contact G, contact 17 of level G, leads 30 and 31, homing contacts 1 and 2, stepper coil 27, *Gnd*.

Also in position 18, motor 32 is activated for freeing the telephone lift slide 33 to return into the illustrated position in which the handset again rests upon its cradle terminating the call.

*Circuit 28.*—Power supply terminal 163, lead 151, contacts 49 and 50 of relay B, lead 51, contact E, contact 18 of level E, leads 148 and 38, motor 32, lead S.

The lift slide 33, when returning into its lower position opens contacts 180, 181 and 39, 40 and recloses contacts 39, 42. The closing of contacts 39 and 42 energizes the stepper coil 27 to step the stepping relay out of position 18 into position 1.

*Circuit 29.*—Power supply terminal 165, leads 152 and 153, contact F, contact 18 of level F, lead 117, contacts 39 and 42 of the switch assembly 38, leads 44 and 31, homing contacts 1 and 2, stepper coil 27, *Gnd*.

In position 18 the $Rec._1$ solenoid is also energized thereby causing the release of the $PL_1$ solenoid and activating snap action switch $Rec._1$ to close its contacts 17 and 18, 120 and 121, as shown in the drawing.

*Circuit 30.*—Power supply terminal 163, lead 150, contact D, contact 18 of level D, lead 145, $Rec._1$ solenoid, lead S.

The closing of contacts 17 and 18 connects the induction coil 2 to the pre-amp. 3 as already described in circuit 1 thereby readying the apparatus to respond to a subsequent telephone ringing signal. The closing of contacts 120 and 121 serves to connect head HI to the output of amp. 4, thus conditioning the apparatus for manual recording onto the endless loop tape 66; such as, for example, the prerecording of the "announcement" message left for the calling party by the subscriber.

*Circuit 31.*—*Gnd*, head HI, lead 57, contacts 120 and 121, lead 62, contacts 147 and 93, lead 61, amplifier 4 out.

With the stepping relay restored to its initial position 1, as described, the apparatus is now again ready to receive additional calls.

AUTOMATIC MESSAGE PLAYBACK

The automatic play-back for playing back the recorded messages comprises a rotary shaft 118. The rotation of shaft 118 is a function of the rotation of supply-reel shaft 119. Shaft 118 seats arms 120 and 121 for joint rotation. Arm 120 is friction fitted upon the shaft 118. An arm 122 is pivotally mounted adjacent to shaft 118 in a relationship such that the arm 121 when revolving bears against arm 122, urging it along. Shaft 118 and arms 120, 121 and 122 are all electrically conductive made, for example, of steel. Hence, during the recording of an incoming call the supply reel shaft 119 will effect the rotation of shaft 118 which, in turn, impels the arms 120, 121 and 122 to rotate away from their respective rest positions into the direction indicated by the arrow. During every incoming telephone call, the arms are advanced further in the direction indicated by the arrow, in direct proportion to the time length of the incoming message being recorded on tape 89. Now let it be assumed that during the elapsed time the telephone subscriber did not answer the telephone, the apparatus has received four calls, having recorded four different messages upon tape 89. Let it be further assumed that as a result of such calls the arms 120, 121 and 122 have been turned through 45 degrees.

At this junction it should be pointed out that in order to effect the playback of messages accumulated on tape 89, it would be necessary (1) To activate the rewind means of the apparatus to cause the tape 89 to be rewound.

(2) The rewind action must be terminated in timed relation to correspond to the time it would take to rewind said accumulated messages recorded on tape 89 at this particular time.

(3) At the proper termination of said rewind action the apparatus must be switched into "play" position, in order to condition it both mechanically and electronically to play back the accumulated messages.

(4) At the conclusion of the play-back of said messages, the apparatus must be switched out of "play" position and restored into "stand-by" position, in readiness for subsequent calls.

It is within the scope of this invention to facilitate all of the aforementioned functions by the mere activation of a single switch, namely switch $SW_2$. The arms 120, 121, and 122 provide the means by which the time lengths of the rewind and play-back periods are automatically regulated. The manner in which this is accomplished is subsequently described. When the subscriber desires to effect the play-back of the recorded messages, he needs merely, momentarily to activate switch $SW_2$ which may be of the push button type. It is preferable that the switch be of the momentary push-in type so that it will not remain closed after the subscriber's release of it. At the activation of said switch, the stepping relay coil 27 will be energized, stepping the relay from position 1 into position 11.

*Circuit 32.*—Power supply terminal 165, lead 152, contact A, contacts 1, 2, 3, 4, 5, 6, 7, 8, 9 and 10 of level A, lead 125, contact 126, pole 127 of switch $SW_2$, leads 128, 30 and 31, homing contacts 1 and 2, stepper coil 27, *Gnd*.

The momentary activation of switch $SW_2$ also effects the energization of the disengage solenoid as the stepping relay passes through position 7, regardless of the switching position of switch SW. This is accomplished as follows:

*Circuit 33.*—Power supply terminal 163, lead 150, contact D, contact 7 of level D, lead 137, contacts 138 and 139 of switch $SW_2$, lead 140, disengage solenoid, terminal S.

The purpose of energizing the disengage solenoid is to release the $PL_1$ solenoid which has been energized as the stepping relay passes thorugh position 2 (see level E, contact 2). In this connection it should be understood that the motor 32 is also activated in position 2

(see level D contact 21), but the activation is of such short duration that it has no appreciable effect upon the lift slide 33 as to lifting the handset 36. The release of the Rec.$_2$ solenoid which also has been energized as the stepping relay passes through position 6 (see level D contact 8) is accomplished as the stepping relay steps through position 10 energizing the stop solenoid. (See level D contact 10). In the stepping relay position 11, the rewind solenoid is energized activating the rewind mechanism of the apparatus to rewind tape 89, back on to the supply reel 123, in a manner well known in the art. The wiring circuitry for the rewind solenoid can be traced as follows:

*Circuit 35.*—Power supply terminal 163, lead 151, contacts 49 and 50 of relay B, lead 51, contact E, contact 11 of level E, lead 59, rewind solenoid, lead S.

In connection with the above it should be noted that the motor 53 is maintained energized from stepping relay position 11 through position 15. The wiring circuitry for motor 53 can be followed in circuit 7. In position 11 the stepper coil 27 is again energized, stepping the stepping relay into position 12.

*Circuit 36.*—Power supply terminal 165, lead 152, contact A, contact 11 of level A, leads 129 and 131, homing contacts 1 and 2, coil 27, G*nd*.

As the tape 89 rewinds off from the take-up reel 130 on to the supply reel 123, shaft 119 again influences the rotation of shaft 118, but this time its rotation is in reverse with respect to the direction during the recording of incoming messages, this being due to the reversal of direction of the travel of tape 89. As a result the arms 120 and 121 return to their initial starting point during the rewind process. The time it would take for said arms to return from the 45-degree point (this being the point they had run during the recording process incident to the example stated above) back to their starting point corresponds exactly to the time it would take to rewind the four messages (as per our example) which have accumulated on tape 89, during the subscriber's absence. In connection with the above it should be remembered that the arm 122 remains stationary at the 45-degree point during the rewind process since arm 121 does not bear against arm 122 during rewind, but rather travels away from it. When the arm 120 shall have returned to its starting point, it engages the contact 94, thereby completing a circuit for the energization of the stepper coil 27, causing the relay to step out of position 12 into position 13. The circuit connections may be traced as follows:

*Circuit 37.*—Power supply terminal 165, lead 152, contact A, contact 12 of level A, lead 136, contact 94, arm 120, shaft 118, wiper contact 131, leads 132, 129 and 31, homing contacts 1 and 2, stepper coil 27, G*nd*.

In position 13 the stop solenoid is energized. This effects the release of the rewind solenoid, thereby terminating the rewind period.

*Circuit 38.*—Power supply terminal 163, lead 151, contacts 49 and 50 of relay B, lead 51, contact E, contact 13 of level E, leads 149 and 124, stop solenoid, lead S.

In position 13 the stepper coil 27 is again energized, stepping the stepping relay from position 13 into position 15.

*Circuit 39.*—Power supply terminal 165, lead 152, contact A contacts 13 and 14 of level A, leads 119, 129 and 31, homing contacts 1 and 2, stepper coil 27, G*nd*.

In stepping past position 14 the play solenoid $PL_2$ is energized causing the engagement of pressure roller $P_2$ with the capstan C, to drive the tape 89 past head HII. The $PL_2$ solenoid activates the snap action switch $PL_2$ to close its contacts 137 to 138, and 139 to 140. The closing of contacts 137 and 138, switches head HII to the input of the pre-amp. 3.

*Circuit 40.*—G*nd*, head HII, lead 95, lead 134, contacts 137 and 138, leads 135 and 20, input of pre-amp. 3.

The closing of contacts 139 and 140 switches the speaker 60 to the output of amp. 4.

*Circuit 41.*—G*nd*, speaker 60, lead 64, contacts 139 and 140, lead 61, output of amp. 4.

The apparatus is now playing back the messages accumulated on tape 89 to the subscriber. The direction of the tape 89 travel is again in the forward direction, that is, from the supply reel 123 to the take-up reel 130. Correspondingly, shaft 119 again influences the rotation of arm 121 in the direction indicated by the arrow as was the case during the recording of the incoming messages. However, at the conclusion of the reproduction of the four messages (as per example) the arm 121 will have returned to the 45-degree point where it had left the arm 122 previous to the rewind again bearing upon said latter arm, thus completing a circuit for the energization of the stepper coil 27 to cause the stepping of the stepping relay out of position 15 into position 16.

*Circuit 42.*—Power supply terminal 165, lead 152, contact A, contact 15 of level A, lead 143, arms 122 and 121, shaft 118, wiper contact 131, leads 132, 129 and 31, homing contacts 1 and 2, coil 27, G*nd*.

In this connection it should be noted that the arm 120 is magnetically retained in the starting position, during the messages' play-back period, by the electromagnet **120*a* since, as previously stated, arm 120 is merely friction fitted upon shaft 118**.

*Circuit 43.*—Power supply terminal 163, lead 151, contacts 49 and 50 of relay B, lead 51, contact E, contact 15 of level E, lead 144, electromagnet **120*a***, lead S.

As is now evident, at any time prior to a play-back, the distance of the arm 120 from its starting point, namely contact 94, is representative of new messages recorded onto tape 89. Thus, when a subscriber activates the apparatus for automatic play-back, only the new series of messages will be played back, avoiding the repetitious play-back of the already heard messages. In position 16 the stop solenoid is energized releasing the $PL_2$ solenoid, switching the apparatus out of "play-back" condition.

*Circuit 44.*—Power supply terminal 163, lead 151, contacts 49 and 50 of relay B, lead 51, contact E, contact 16 of level E, leads 149, and 124, stop solenoid, lead S.

In position 16, the stepper coil 27 is again energized stepping the stepping relay into position 17.

*Circuit 45.*—Power supply terminal 165, lead 152, contact A, contact 16 of level A, leads 129 and 31, homing contacts 1 and 2, stepper coil 27, G*nd*.

From position 17, the circuit for the resetting of the apparatus to its initial condition has already been described and can be followed in the description, starting following the description of circuit 25 and ending with circuit 37.

While the invention has been described in detail with respect to a certain now preferred example and embodiment of the invention it will be understood by those skilled in the art after understanding the invention, that various changes and modifications may be made without departing from the spirit and scope of the invention, and it is intended therefore, to cover all such changes and modifications in the appended claims.

What is claimed as new and desired to be secured by Letters Patent is:

1. A telephone-answering apparatus for association with a telephone receiver, said apparatus comprising, in combination, a movable first sound carrier in the form of an endless loop for prerecording thereon within a loop cycle a message to a calling party, a movable second sound carrier for recording thereon a message from the calling party, electrically operated activating means for closing the communication circuit of the telephone receiver to ready the same for transmission of sound, circuit means including said activating means and an inductance means generating a signal in response to a flow of ringing current in said telephone receiver, said signal energizing said circuit means for operating said activating means, means for activating said first sound carrier to reproduce the message recorded thereon, first actuating circuit means for readying said second sound carrier for recording thereon message signals from the calling party, means for recording on the second carrier a message incoming from the calling party through the receiver, second circuit means controlled by the first carrier for stopping the second sound carrier after a predetermined period of time during which a message from the calling party is recorded thereon, a switch means arranged to be activated by the ringing signal of an incoming call through said telephone receiver, control circuits controlled by the switching position of said switch means and controlling the operation of the aforesaid means in a predetermined sequence in response to a change in the switching position of said switch means, a plurality of control circuits for said means, each controlled by the operation of a respective one of said means and controlling movement of said switch means from an initial switching position into a terminal switching position, play-back means for reproducing messages recorded on said second sound carrier, actuating means for activating said play-back means for reproduction, and play-back control means limiting actuation of the play-back means to a portion of the second sound carrier bearing recorded messages accumulated thereon subsequent to the last preceding operation of the play-back-actuating means.

2. A telephone-answering apparatus for association with a telephone receiver having a base and a handset resting upon a cradle on the base, said apparatus comprising, in combination, a first movable recording tape in the form of an endless loop for prerecording thereon within one loop cycle a message to a party calling said associated receiver, a second movable recording tape for recording thereon a message from the calling party, a handset-activating mechanism to effect connection and disconnection respectively of a sound-transmitting circuit in the base of the receiver, first actuating means for driving and activating said tape loop for reproduction of the message recorded thereon, first actuating circuit means for stopping and deactivating said tape loop upon completion of one cycle, second actuating means for driving and activating said second tape for recording thereon message signals from the calling party transmitted through the receiver, second actuating circuit means controlled by the first actuating circuit means for stopping and deactivating said second tape upon expiration of a predetermined period of no-signal reception, third actuating circuit means for stopping and deactivating said second tape upon expiration of a predetermined period of time, relay means movable through intermediate switching positions from a starting position to a terminal position for controlling operation of said mechanism, said first and second tape-actuating means and said first, second and third actuating circuit means in a predetermined sequential order, means inductively responsive to a ringing signal at said receiver for activating said relay means, activation of said relay means by the inductive means actuating said mechanism to activate the handset, a plurality of control circuits controlled by the switching positions of the relay means and interconnecting said relay means, said actuating means and said actuating circuit means in circuits such that operation of any one of said tape-driving means and actuating circuit means respectively effects switching of the relay means toward the terminal position and that switching of the relay means through successive intermediate positions effects deactivation of the respective one of the means causing the switching and also actuation of the respective means next following in said predetermined sequence, further control circuits controlled by switching of the relay means toward and into the terminal position to effect operation of said mechanism for deactivating the handset to disconnect said communication circuit and return of the relay means into the starting position, and switch means for placing a selected one of said second and third actuating circuit means under the control of the control circuits, said handset activating mechanism including a member movable between a handset rest position and a handset raised position, electric motor means for lifting said member from the rest position into the raised position, said motor means being energized by actuation of said relay means, and retaining means for retaining said member in the raised position upon de-energization of the motor means in a predetermined position of the relay means, re-energization of the motor means in another predetermined position returning said member into the rest position.

3. A telephone-answering apparatus according to claim 2 and further comprising fail-safe means including electrically operated means coacting with said slidable member and said retaining means and connected in an energizing and control circuit energized upon actuation of the switch means by said inductive means and during switching of the switch means, de-energization of said circuit due to a failure of the power causing said electrically operated means to release the retaining means in any switching position of the relay means for return of the slide member into the rest position by force of gravity.

4. A telephone-answering apparatus for association with a telephone receiver, said apparatus comprising, in combination, a movable first sound carrier in the form of an endless loop for prerecording thereon within a loop cycle a message to a calling party, said endless loop including actuating means, a movable second sound carrier for recording thereon a message from a calling party, common drive means selectively operable for driving said first and second sound carriers, first control circuit means controlled by an incoming call through the telephone receiver and connecting said drive means in an energizing circuit for driving the first sound carrier through one cycle, second control circuit means controlled by said actuating means upon completion of said one cycle to connect the drive means for driving both carriers, and third control circuit means controlled by said actuating means by completion of a second cycle to disconnect the drive means from both carriers.

5. In a telephone-answering apparatus for association with a telephone receiver, said apparatus comprising, in combination, a first sound carrier in the form of an endless loop for prerecording thereon within a loop cycle a message to a calling party, said endless loop including actuating means, a second sound carrier for recording thereon a message from a calling party, drive means for driving said first and second sound carriers, starting means actuated by an incoming call through said telephone receiver and actuating said drive means, switch means, control means for positioning said switch means to ready said apparatus for recording a message from a calling party on said second sound carrier, said control means being activated by said actuating means upon the completion of a first loop cycle and positioning said switch means to effect the return of the apparatus into the initial position upon completion of a second loop cycle.

6. In a telephone-answering apparatus for association with a telephone receiver, said aparatus comprising, in combination, a first sound carrier in the form of an endless loop for prerecording thereon within a loop cycle a message to a calling party, said endless loop including actuating means, a second sound carrier for recording thereon a message from a calling party, a common drive means for driving said first and second sound carriers, starting means actuated by an incoming call through said telephone receiver and actuating said common drive means, switch means, control means for positioning said switch means to ready said apparatus for recording a message from a calling party on said second sound carrier, said control means being activated by said actuating means upon completion of a first loop cycle and positioning said switch means to effect the return of the apparatus into the initial position upon completion of a second loop cycle.

7. A telephone-answering apparatus for association with a telephone receiver, said apparatus comprising, in combination, a movable first sound carrier in the form of an endless loop for prerecording thereon within a loop cycle a message to a calling party, said endless loop including actuating means, a movable second sound carrier for recording thereon a message from a calling party, drive means selectively operable for driving the first and second sound carriers, first control circuit means controlled by an incoming call through the telephone receiver and connecting said drive means in an energizing circuit for driving the first sound carrier, second control circuit means controlled by said actuating means upon said loop reaching a predetermined cycling position to connect the drive means for driving both carriers, and third control circuit means controlled by said actuating means to disconnect the drive means from both carriers upon said loop reaching another predetermined cycling position.

8. A telephone-answering apparatus for association with a telephone receiver, said apparatus comprising, in combination, a movable first sound carrier in the form of an endless loop for prerecording thereon within a loop cycle a message to a calling party, said endless loop including actuating means, reproducing means for reproducing the message from said loop, a movable second sound carrier for recording thereon a message from a calling party, recording means for recording on said second carrier, drive means selectively operable for driving said first and second sound carriers, switch means, starting means actuated by an incoming call through said telephone receiver and actuating said switch means to activate said reproducing means and connecting said drive means for driving said first sound carrier, first control circuit means controlled by said actuating means upon said loop reaching a predetermined cycling position and controlling said switch means to deactivate the reproducing means, to activate the recording means and to connect the drive means for driving said second carrier, and second control circuit means controlled by said actuating means and controlling said switch means to deactivate the recording means and the drive means for effecting the return of the apparatus into the initial position upon said loop reaching another predetermined cycling position.

9. A telephone-answering apparatus for association with a telephone receiver, said apparatus comprising, in combination, a movable first sound carrier in the form of an endless loop for prerecording thereon within a loop cycle a message to a calling party, said endless loop including actuating means, a movable second sound carrier for recording thereon a message from a calling party, common drive means operable for driving said first and second sound carriers, first control circuit means controlled by an incoming call through the telephone receiver and connecting said drive means in an energizing circuit for driving the first sound carrier, second control circuit means controlled by said actuating means to connect the drive means for driving both carriers upon said loop reaching a predetermined cycling position, and third control circuit means controlled by said actuating means to disconnect the drive means from both carriers upon said loop reaching another predetermined cycling position.

10. A telephone-answering apparatus for association with a telephone receiver, said apparatus comprising, in combination, a movable first sound carrier in the form of an endless loop for prerecording thereon within a loop cycle a message to a calling party, said endless loop including signal means, reproducing means for reproducing the message from said loop, a movable second sound carrier for recording thereon a message from a calling party, recording means for recording on said second carrier, common drive means operable for driving said first and second sound carriers, switch means, starting means actuated by an incoming call through said telephone receiver actuating said switch means to activate said reproducing means and connecting said drive means for driving said first sound carrier, first control circuit means controlled by said signal means and controlling said switch means to deactivate the reproducing means and activating the recording means and connecting the drive means for driving said second carrier, and second control circuit means also controlled by said signal means at the completion of the loop cycle, said second control circuit means controlling said switch means to deactivate the recording means and the drive means for effecting the return of the apparatus into an initial position.

11. In a telephone answering and recording device having instrumentalities and the necessary circuit connections thereto including a power circuit for performing an automatic telephone answering function, a pre-recorded message play-out function, selectively an incoming-message recording function of a fixed-time cycle duration period and a non-cycle, non-fixed time duration period, and a message play-back function; said instrumentalities and circuit connections for performing said pre-recorded message play-out function including a movable sound carrier in the form of an endless loop containing actuating means; in combination, a plurality of individual first switching means for controlling said functions, and a manually operable second switching means, the setting of which in cooperation with said actuating means and said first switching means preselects the time duration periods of said incoming-message record function.

12. The combination as claimed in claim 11 wherein said actuating means coact with said first and second switching means to control the time duration periods of said incoming-message record function.

13. In an electrically operated telephone answering device, means to perform a plurality of related functions including automatic answering and incoming message recording over a telephone line and the play-back of said messages, said means including: a windable magnetic message storage medium having recording, play-back and rewind drive means; said drive means including rewind control means limiting the rewind portion of the said medium to correspond to a second portion of same bearing recorded messages accumulated thereon subsequent to the last preceding operation of the message play-back function, said rewind control means having a control member drivingly coupled with said storage medium and movable in unison with same during each recording in one direction relative to a starting position, and during rewind in the opposite direction; said control member actuating rewind control circuit means upon its return to the starting position stopping the said rewind drive means.

14. The combination as claimed in claim 13 wherein said rewind control means includes retaining means adapted for retaining said control member at said starting position upon its return to same subsequent to an initiation of the message play-back function.

15. The combination as claimed in claim 14 wherein said retaining means comprises an electro-magnet.

16. In an electrically operated telephone answering device, means to perform a plurality of related functions including automatic answering and incoming message recording over a telephone line and the play-back of said messages, said means including: a windable magnetic message storage medium having recording, play-back and rewind drive means; said drive means including play-back control means limiting the play-back portion of the said medium to correspond to a second portion of same bearing recorded messages accumulated thereon subsequent to the last preceding operation of the message play-back function, said play-back control means having a control member drivingly coupled with said storage medium and movable in unison with same during each recording and play-back in one direction and during rewind in the opposite direction relative to a rewind starting position, said control member, subsequent to a rewind operation, moving in said play-back direction towards said rewind starting position and actuating play-back control circuit means upon its return to the said rewind starting position terminating the message play-back function.

17. The combination as claimed in claim 16 including switching means actuated by said play-back control circuit means at the completion of the said message play-back function, said switching means resetting the apparatus into the said automatic answering function in readiness to receive additional calls.

18. In an electrically operated telephone answering device, means to perform a plurality of related functions including automatic answering and incoming message recording over a telephone line and the play-back of said messages, said means including: a windable magnetic message storage medium having recording, play-back and rewind drive means; said drive means including rewind and play-back control means limiting the rewind and play-back portion of the said medium to correspond to a second portion of same bearing recorded messages accumulated thereon subsequent to the last preceding operation of the message play-back function; said rewind and play-back control means having first and second control members respectively, drivingly coupled with said storage medium and movable in unison with same, said first control member during each recording moving into one direction relative to a starting position, and during rewind into the opposite direction; and rewind control circuit means controlling the rewind drive means and controlled by said first control member, stopping the rewind means upon its return to the said starting position; and said second control member during each recording and play-back moving into one direction and during rewind into the opposite direction relative to a rewind starting position, and play-back control circuit means controlling the play-back drive means and controlled by the second control member, subsequent to a rewind operation, moving into said play-back direction towards said rewind starting position and actuating said play-back control circuit means upon its return to the said rewind starting position terminating the message play-back function.

19. In a telephone answering apparatus according to claim 18; in combination a plurality of switching means for controlling said functions, and a manually operable switch means connected in circuit with said first switching means for initiating said message play-back function by operation of said manual switch means.

20. The combination as claimed in claim 19; wherein said second switch means is a momentary non-latching type switch means.

References Cited in the file of this patent

UNITED STATES PATENTS

| | | |
|---|---|---|
| 2,665,337 | Handschin | Jan. 5, 1954 |
| 2,793,252 | Augustadt | May 21, 1957 |
| 2,815,401 | O'Dwyer | Dec. 3, 1957 |
| 2,835,737 | Shively | May 20, 1958 |
| 2,856,812 | Barrow | Oct. 21, 1958 |
| 2,864,889 | O'Dwyer | Dec. 16, 1958 |
| 2,896,945 | Waldman | July 28, 1959 |
| 2,927,975 | Jamieson | Mar. 8, 1960 |
| 2,928,898 | Salzberg | Mar. 15, 1960 |

FOREIGN PATENTS

| | | |
|---|---|---|
| 732,718 | Great Britain | June 29, 1955 |